No. 637,722. Patented Nov. 21, 1899.
E. ERICKSON.
BICYCLE TIRE REPAIRER.
(Application filed Apr. 17, 1899.)
(No Model.)

WITNESSES
Wm. H. Varnum.
A. W. Hamblen.

INVENTOR
Edward Erickson
by Henry J. Miller
atty.

UNITED STATES PATENT OFFICE.

EDWARD ERICKSON, OF BOSTON, MASSACHUSETTS.

BICYCLE-TIRE REPAIRER.

SPECIFICATION forming part of Letters Patent No. 637,722, dated November 21, 1899.

Application filed April 17, 1899. Serial No. 713,241. (No model.)

*To all whom it may concern:*

Be it known that I, EDWARD ERICKSON, of Boston, in the county of Suffolk and State of Massachusetts, have invented a new and useful Improvement in Bicycle-Tire Repairers; and I hereby declare that the following is a full, clear, and exact description of the same, reference being had to the accompanying drawings, forming part of this specification.

This invention relates to improvements in bicycle-tire repairers, and particularly to improvements in tools by means of which the closure is applied.

The object of the invention is to construct a tool for use in applying puncture-closures to pneumatic tires that the tool may adjust itself to insert and hold the inner portion of the closure in position to be secured.

The invention consists in an inserting and holding tool having a pivoted portion furnished with means adapted to engage complemental means on the closure.

The invention also consists in the construction of the tool.

The invention still further consists in such other novel features of construction and combination of parts as shall hereinafter be more fully described, and pointed out in the claim.

Figure 1:
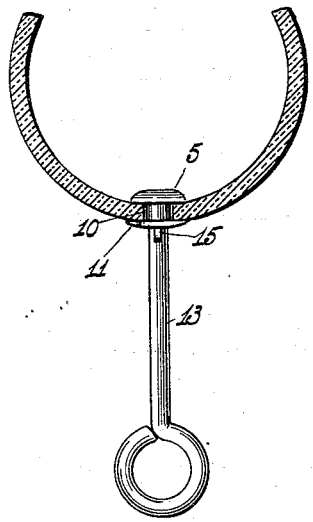
Figure 2:
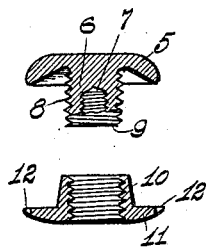
Figure 3:
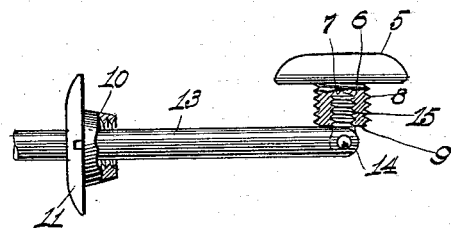

Figure 1 represents a sectional view of a portion of a pneumatic tire, showing a closure as being applied thereto by the use of the improved tool. Fig. 2 represents an enlarged sectional view of a puncture-closure particularly adapted for use with the improved tool, more clearly showing the construction thereof. Fig. 3 represents an enlarged view of the inserting and holding tool for the inner member with said member partially in section, showing the relation of the member with the tool.

Similar numbers of reference designate corresponding parts throughout.

Devices of this nature for closing punctures in pneumatic tires are necessarily small and difficult to handle while being inserted in the tire and while being secured. It is also of importance that the puncture-closing devices should have the greatest strength consistent with their size, and should be of simple construction and operation.

In carrying my invention into practice it has been my desire to so construct a tool for a metallic puncture-closing device that while the inner member could be rigidly held by the tool during the insertion of the same the tool could be afterward swung to a position to draw the inner member in place and to permit the outer member to be secured to the post of the inner member.

To clearly illustrate the operation of my invention, I have shown a metallic puncture-closure comprising an inner member having a head 5, convex on its outer surface and somewhat dished on its inner surface. In the dished portion is the post 6, formed in part with the head 5 or rigidly secured thereto, but preferably the former, as thereby the utmost strength may be secured. In the end of the post is the screw-threaded socket 7, and the periphery of the post has the thread 8, extending in a direction opposite to that of the socket-thread, and the end of the post has the surface 9, substantially at right angles with its axis. The outer member has the collar 10, tapering on its outer surface and screw-threaded on its inner surface to engage with the screw-thread 8 of the post 6, and from the base of the collar extends the annular flange 11, adapted to bear on the outer surface of the tire when screwed into place on the post 6 by means of a tool having portions fitting into the notches 12 12 with which the flange is furnished.

The inserting and holding tool has the shank 13 with the curved end 14 transversely slotted. In the slot is pivoted the flat portion of the cylindrical screw-threaded finger 15, which finger is adapted to screw into the socket 7 of the post of the inner member. When the finger 15 is screwed into the socket of the post 6, the outer member having previously been slipped onto the shank 13, the end surface 9 of the post may swing in the arc of the surface 14 of the shank 13 for a moderate degree; but when the finger 15 is swung to bring the inner member to the position shown in Fig. 3 the surface 9 of the post bears against the side of the shank, acting as a stop, while the juncture of the curve 14 with the side of the shank 13 acts as a locking-shoulder, tending to hold it against the surface 9 to prevent the swinging of the finger 15, thus effecting a more positive control of the head 5 in passing the same through a perforation of smaller diameter, although in somewhat elastic material. The puncture in the tire having been located and enlarged to circular shape, if need be, by any ordinary means, the head 5 of the inner member, mounted on the tool, is forced through the puncture. The tool-shank 13 is then swung on the pivot to bring it in line with the finger 15. The tool is then drawn outward, drawing the post 6 through the puncture, and the outer member is then slipped along the shank 13 and screwed onto the outer thread 8 of the post 6, first being turned by the fingers and then being tightened by a spanner engaging the notches 12 12 in the flange 11. The finger 15 is then unscrewed from the socket 7 and the repair is completed, the portion of the tire about the puncture being firmly grasped between the flange 11 and the head 5.

Having thus described my invention, I claim as new and desire to secure by Letters Patent—

In a bicycle-tire repairer, an inserting and holding tool comprising a shank having parallel sides and a rounded end, and a finger of a diameter equal to that of the shank pivotally secured in the rounded end and having an engaging device.

EDWARD ERICKSON.

Witnesses:
THOMAS R. CURTIS,
HENRY J. MILLER.